US 6,477,590 B1

(12) United States Patent
Habusha et al.

(10) Patent No.: US 6,477,590 B1
(45) Date of Patent: Nov. 5, 2002

(54) METHOD AND SYSTEM FOR MESSAGE TRANSFER SESSION MANAGEMENT

(75) Inventors: Uri Habusha, Mitzpe Hoshaya; Yoel Arnon, Haifa, both of (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/707,688

(22) Filed: Nov. 7, 2000

Related U.S. Application Data

(62) Division of application No. 09/053,415, filed on Apr. 1, 1998, now Pat. No. 6,205,498.

(51) Int. Cl.[7] .............................................. G06F 13/14
(52) U.S. Cl. ...................... 710/29; 709/221; 379/229; 340/825.5
(58) Field of Search ....................... 710/29; 379/229; 709/221; 340/825.5

(56) References Cited

U.S. PATENT DOCUMENTS 4,117,459 A * 9/1978 Douglas et al. ............... 714/55
4,622,013 A * 11/1986 Cerchio ....................... 434/118
5,287,362 A * 2/1994 Liencres ...................... 714/55

* cited by examiner

Primary Examiner—Jeffrey Gaffin
Assistant Examiner—Abedelmoniem Elamin
(74) Attorney, Agent, or Firm—Leydig, Voit & Mayer, Ltd.

(57) ABSTRACT

A method and system for managing the transfer of message packets between first and second nodes in a message queuing system utilizes a session acknowledgment protocol to coordinate the two-way flow of packet transmission. In a session initiation phase, each node specifies a session acknowledgment timeout period and a transmission window size for transmission of message packets thereto. During the session, the first node transmits multiple message packets up to the window size set by the second node and stops to wait for a session acknowledgment from the second computer. The session acknowledgment may piggyback on a message packet sent to the first node. A window-size field in the session acknowledgment allows the receiving node to dynamically adjust the incoming data flow.

13 Claims, 5 Drawing Sheets

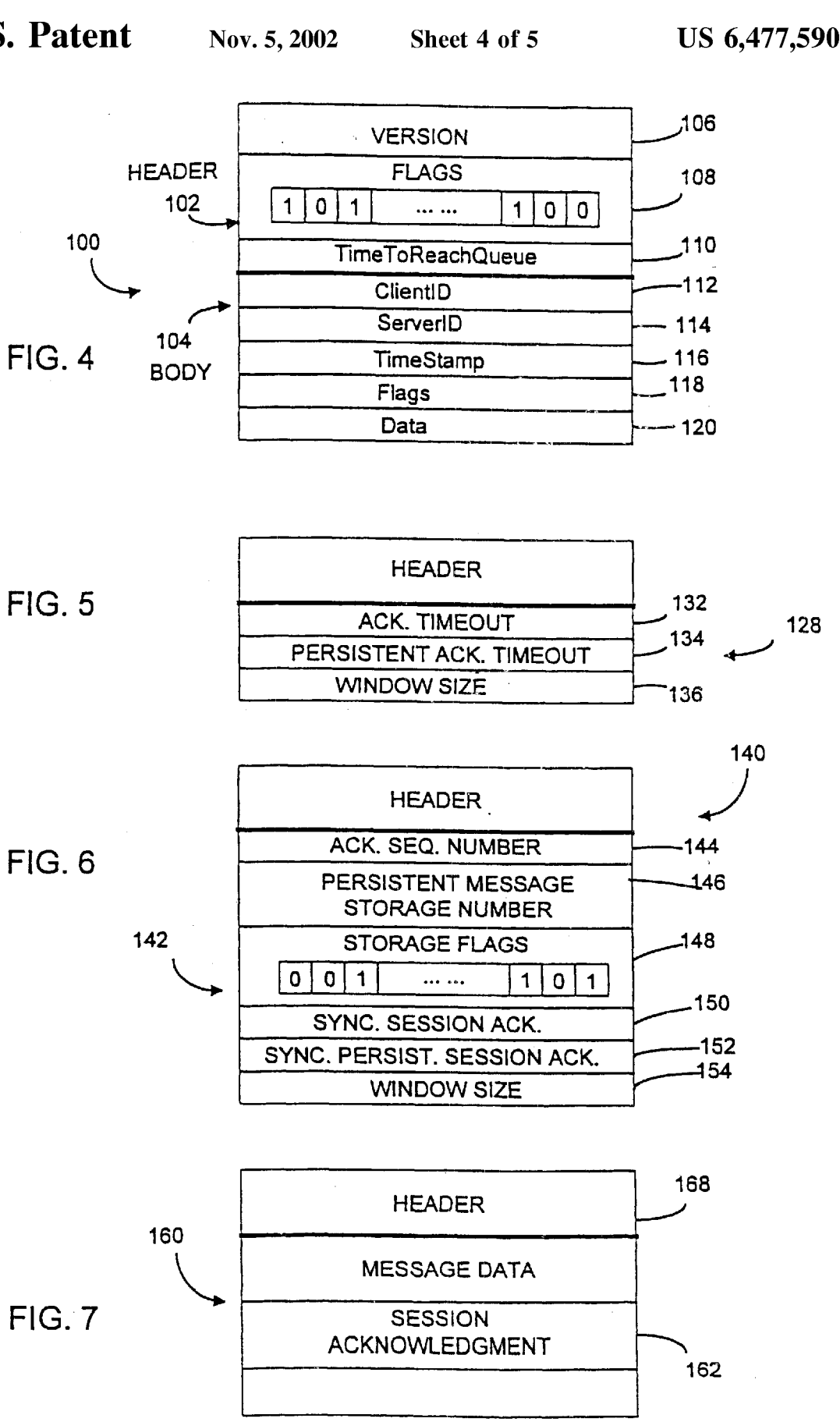

METHOD AND SYSTEM FOR MESSAGE TRANSFER SESSION MANAGEMENT

This application is a divisional of patent application Ser. No. 09/053,415 filed Apr. 1, 1998 now U.S. Pat. No. 6,205,498.

FIELD OF THE INVENTION

This invention relates generally to message queuing systems, and more particularly to the management of a session between two nodes in a message queuing system for transferring messages.

BACKGROUND OF THE INVENTION

A message queuing system enables applications in a distributed processing network to send messages to, and receive messages from, other applications. A message may contain data in any format that is understood by both the sending and receiving applications. When the receiving application receives a request message, it processes the request according to the content of the message and, if required, sends a response message back to the original sending application. The sending and receiving applications may be on the same machine or on separate machines connected by a network. While in transit between the sending and receiving applications, the message queuing system keeps messages in holding areas called message queues. The message queues protect messages from being lost in transit and provide a place for an application to look for messages sent to it when it is ready.

When one application in the message queuing system sends a message to a receiving application on a remote computer, the message is often routed through a network of intermediate nodes in the message queuing system. Each node in the message route passes the message on to the next node by establishing a session therewith using a standard communication protocol. In some cases, the connection between the two nodes can fail, but the underlying communication protocol does not detect the connection failure and therefore cannot inform the message queuing system of the lost connection. To overcome this problem, an acknowledgment mechanism at the message queue (MQ) server level has to be developed for indicating whether the message transfer has been successful.

A conventional acknowledgment mechanism which sends an acknowledgment for each message or based on a maximum segment size is not adequate for managing the message transfer session for several reasons. The message queuing system is an asynchronous system in which the sending of a message or an acknowledgment does not coincide with the establishment of the session connection. As a result, the sending node in the session does not know when the acknowledgment may be received. Moreover, the same session between the two nodes is to be used for both sending and receiving messages by either node. The conventional acknowledgment mechanism is not adequate to prevent messages sent by one node from colliding with messages sent by the other node. Also, in terms of performance, the acknowledgment mechanism is unsatisfactory because the sending node cannot afford to stop and wait for an acknowledgment every time it sends a message using the session connection.

A message queuing system may include a large number of networked computers, which may go on and off at random intervals. To manage a large network, an administrator often needs a report of the operating status of the different computers in the network. This report does not have to be completely accurate, as it only has to provide a general indication of potential problems which will lead to a more in-depth examination of the possibly problematic computers.

In networks using a connection-based communication protocol, it is common to use a program which is commonly called "ping" to detect whether a remote computer is in operation. The ping program takes the address of a remote computer as a parameter and sends an echo request. It then waits for an echo response from that remote computer, and reports whether the response is received within a predefined timeout period. The lack of a response within the timeout period suggests that the remote computer may be out or service.

While the conventional ping approach works well with one computer, it does not allow the administrator to check a large group of computers at one time. Conventional ping applications support communications with a single computer per session. Expanding them to deal with multiple computers is difficult. In addition, the computer that initiates the ping request must also handle the echo response. It cannot redirect the response to another computer or process the response off-line. Moreover, the conventional ping operation only works when both computers are directly connected using a communication protocol. The ping operation will not work if the computers use different communication protocols or belong to separate networks.

SUMMARY OF THE INVENTION

In accordance with the invention, there is provided a method and system for managing transfer of message packets in a session between first and second nodes in a message queuing system that utilizes a session acknowledgment protocol to coordinate the two-way flow of message packet transmission. When a session is initiated, each of the two nodes specifies a session acknowledgment timeout period and a transmission window size. During the session, the first node transmits multiple message packets up to the window size set by the second node and stops to wait for a session acknowledgment from the second node. The second node sends a session acknowledgment when the session acknowledgment timeout period set by the first node has expired, or when the number of packets received but not yet acknowledged has reached the window size. The session acknowledgment may either be sent as a separate message packet or piggyback on a message packet sent by the second node to the first node. A window-size field in the session acknowledgment allows the receiving node to set a new window size to dynamically adjust the incoming data flow.

In accordance with another aspect of the invention, a "multi-ping" mechanism implemented with asynchronous message delivery allows an administrator to check the operating status of multiple computers in the message queuing system. A ping-originator application sends echo request messages to a plurality of remote computers at one time. The echo response messages from the remote computers are sent to a response queue. An administration application reads the echo response messages and displays the operating status of the remote computers for viewing by the administrator.

The advantages of the invention will become apparent with reference to the following detailed description when taken in conjunction with the drawings in which:

BRIEF DESCRIPTION OF THE DRAWINGS

FIG. 4 is a schematic diagram showing the format of a message packet for initiating a message transfer session;

FIG. 5 is a schematic diagram showing the format of a message packet for passing parameters for managing a message transfer session;

FIG. 6 is a schematic diagram showing the format of a message packet for session acknowledgment;

FIG. 7 is a schematic diagram showing the format of a message packet which includes a session acknowledgment section;

Figure 1:
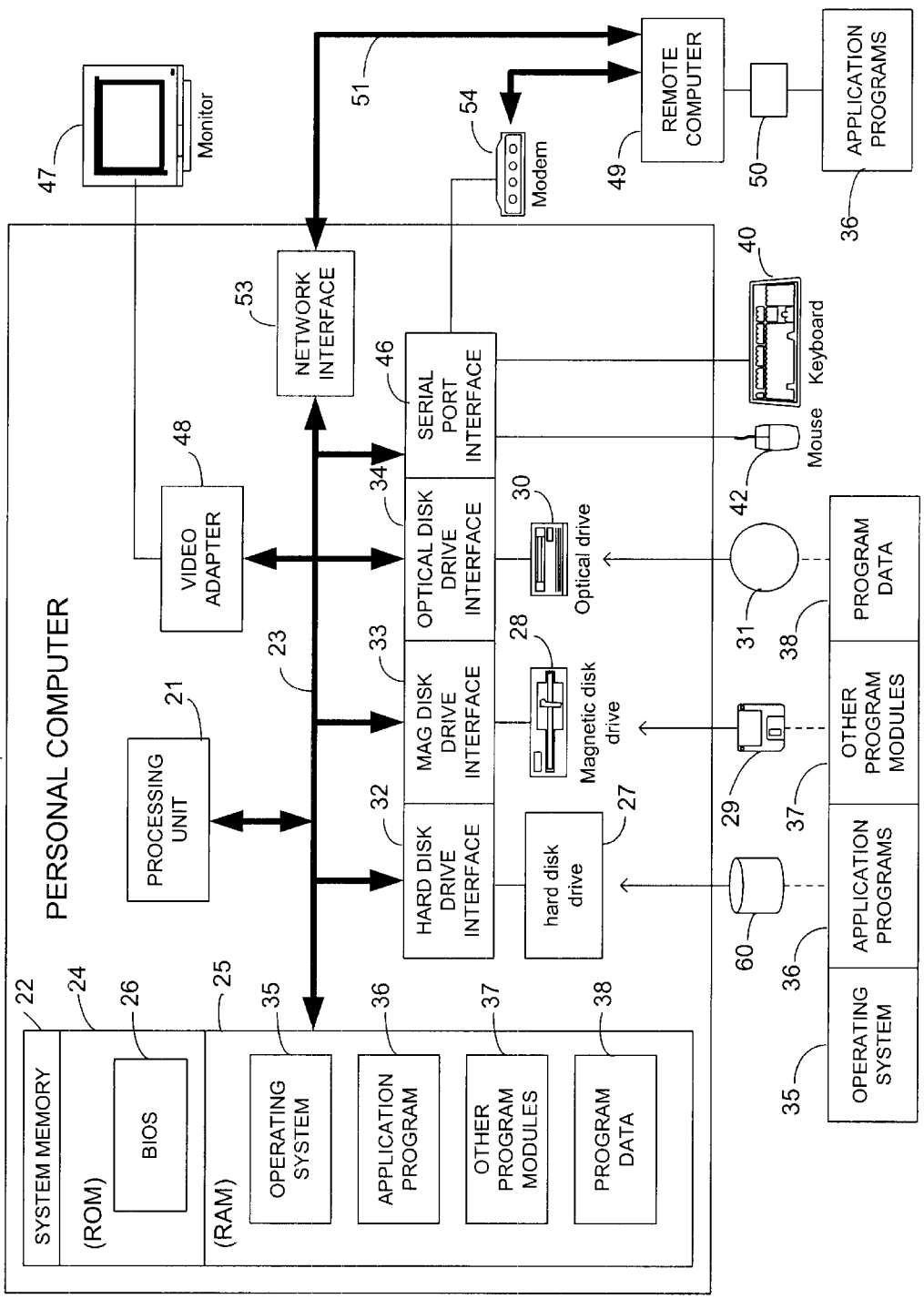
FIG. 1 is a block diagram of a computer system that may be used to implement a method and system for managing a message transfer session according to the invention.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the invention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 and the following discussion are intended to provide a brief, general, description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules-depicted relative to the personal computer 20, or portions thereof, may be stored in the remote memory storage device. It will be appreciated that the network connections shown are exemplary and other means of establishing a communications link between the computers may be used.

Figure 2:
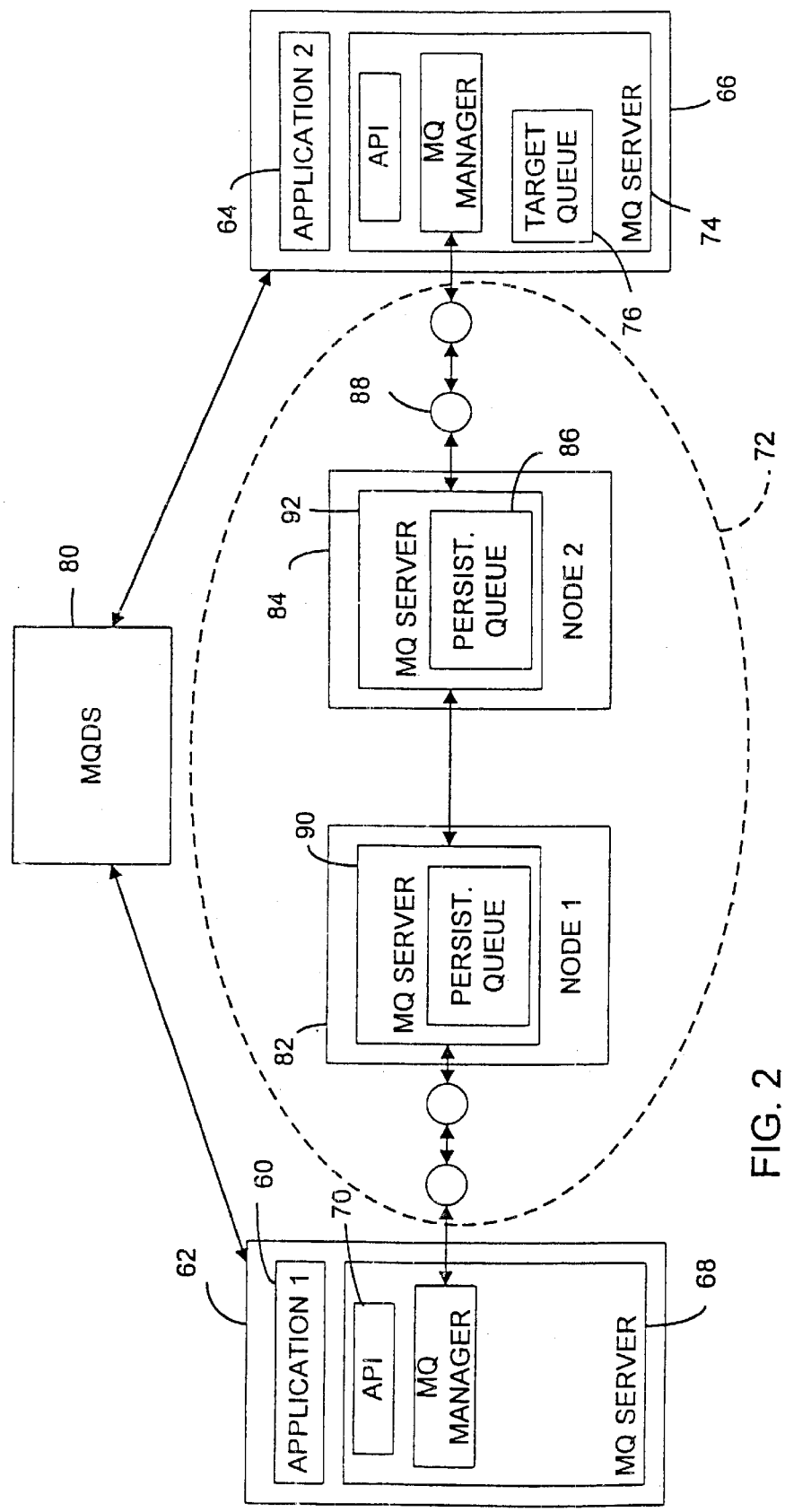
FIG. 2 is a schematic diagram showing a message queuing system in which two computers exchanging messages are connected by a message route with intermediate nodes.

The present invention is directed to the coordination of message transfer in a session established between two nodes in a message queuing system. Referring to FIG. 2, an application 60 running on a computer 62 sends a message to a second application 64 on a remote computer 66 which is connected to the first computer by a network 72 of intermediate nodes. The source and destination computers and the intermediate nodes each has a message queue (MQ) server. The application 60 on the source computer 62 interacts with the MQ server 68 through an application programming Interface (API) layer 70 to send the message. The message queuing system routes the message through the network 72 of intermediate nodes to the MQ server 74 of the destination computer. The message routing is performed according to routing information provided by a message queue directory service (MQDS) 80 of the message queuing system. The message is received by the MQ server 74 of the destination computer and placed in a target queue 76 for retrieval by the destination application 64. While in transit, the message is transferred (or "hops") from one node (e.g., the node 82) within the network 72 to the next node (e.g., node 84) in the message route via a direct communication session established between the two nodes. This direct communication session is established for each node specified in the routing information so that the message can be received by the destination computer. As noted above, each node in the network 72 includes an MQ server, although for purposes of simplicity FIG. 2 only shows nodes 82 and 84 as having MQ servers. It will also be appreciated that the session for message transfer may be between the source and destination computers if the two can directly access each other. The message transfer session may be formed using one of several commonly used communication protocols, such as TCP/SPX.

The message queuing system may support multiple types of messages which are different in the ways they are delivered across the network 72. In a preferred embodiment, the message queuing system supports three types of messages: express, persistent, and transaction. An express message is delivered by simply forwarding it from one node to the next node in the message route without provision for recovery from crash. Thus, there is no guarantee that an express message will ultimately reach the destination node. Nevertheless, because of the lower overhead involved in the delivery operation, the express message delivery may be the fastest way to send a message. A persistent message is delivered in a way that allows recovery if the message hopping operation crashes. The recoverability guarantees that the message will ultimately make its way to the destination node. A persistent message, however, may be delivered out of order with respect to other messages from the same sending node, and the destination node may receive duplicated copies of the message. In contrast, a transaction message is delivered in a way that guarantees exactly-once and in-order delivery of the message.

The persistence of the delivery of a persistent message is achieved using a "store-and-forward" approach. In this approach, a copy of a persistent message in transit is stored in a persistent queue 86 on a disk (or another type of non-volatile memory) of a sending node 84 before the message is forwarded to the next node 88. The stored copy is deleted only after the message has been successfully forwarded to the next node in a message transfer session. As used herein, the term "persistent message" means a message which is delivered using the store-and-forward approach.

In an embodiment of the invention, to support the persistent message delivery, each persistent message is given a sequence number for identification and tracking. When a session is established between the two nodes 82 and 84, for example, both sides initialize a "Persistence Packet Sent Number" and a "Persistence Packet Received Number" to zero. When the first node sends a persistent message packet, it increments its Persistence Packet Sent Number by one and virtually assigns this number to the packet as the packet sequence number. The sequence number is not sent with the packet. When the second node receives the packet, it increments its Persistence Packet Received Number and assigns the number to the received packet. Since the underlying communication protocol for the session between the two nodes ensures that the packets transmitted by the sending node 82 are received in order and only once by the receiving node 84, both nodes in the session are expected to assign the same sequence number to the same persistent message packet.

When the packet reaches the second node 84, it is stored in the persistence queue 86 on the disk. When the storage is completed, the node 84 sends a storage acknowledgment to the first node 82. After receiving the storage acknowledgment, the first node either stops its storage operation or removes the stored copy of the packet from its persistence queue on the disk.

In accordance with an aspect of the invention, the successful transfer of messages between two nodes 82, 84 is facilitated by the use of a session acknowledgment protocol handled by the MQ servers 90, 92 of the two nodes. The session acknowledgment protocol allows each node to establish session parameters for coordinating the data flow in both directions, such as timeout periods for sending acknowledgments and the window size for data transmission. As will be described in greater detail below, the timeout periods are used by each node to require the other node in the session to respond to message transfer in a timely fashion. The window sizes allow a node to set an upper limit for incoming message transmission according to its available resources.

Figure 3:
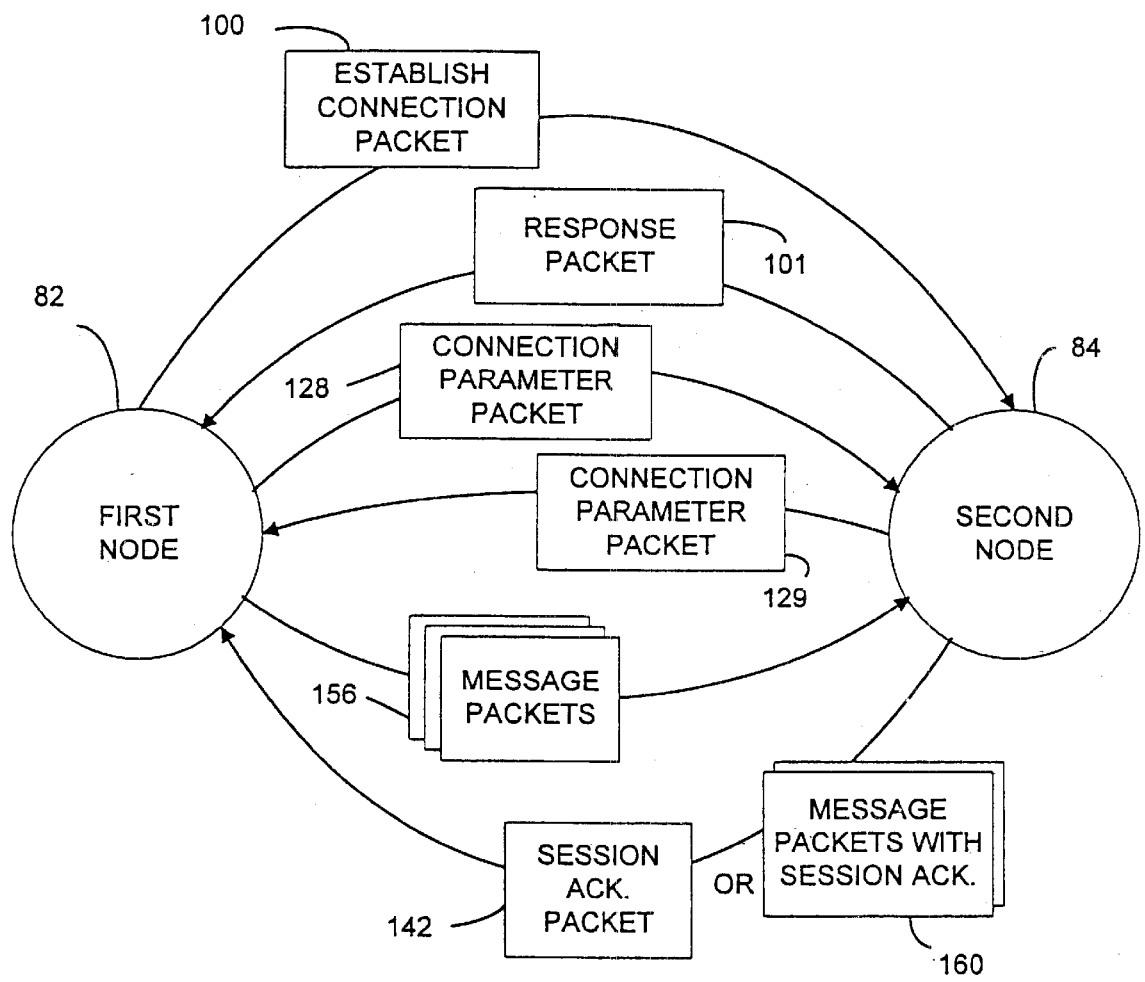
FIG. 3 is a schematic diagram showing two nodes in a message route communicating with each other during a message transfer session by passing packets.

Referring to FIG. 3, according to the session protocol, a message transfer session is established by exchanging packets between the two nodes 82, 84 involved in the session to set up parameters for the session. The node 82 initiates a session by sending an Establish_Connection packet 100 to the node 84 it wants to establish a session with using a pre-selected standard communication protocol. The node 84 returns a response packet 101 to the first node 82 to indicate whether it agrees to have a session. If the response is positive, the first node 82 sends to the second node 84 a Connection_Parameter packet 128 which contains session parameters set by the first node. In return, the node 84 sends its Connection_Parameter packet 129 containing its session parameters to the node 82, thereby concluding the phase of establishing the session. The node 82 which has initiated the session then sends message packets 156 up to the number limit set by the node 84. After receiving the packets 156 from the node 82, the node 84 sends a session acknowledgment packet 140 or alternatively message packets 160 which include the session acknowledgment information.

Referring to FIG. 4, in the illustrated embodiment, the Establish_Connection packet 100 sent by the node 82 for initiating the session includes a basic header 102 and a data body 104 each having multiple fields. The Version field 106 in the header 102 contains a version number which is used to identify the general packet format. The Flags field 108 is a bit map for indicating the specific type and contents of the packet. A Packet-Type bit indicates whether the packet is a user packet or an internal packet. A user packet contains message data to be delivered to a destination queue. An internal packet, on the other hand, is passed only between two adjacent nodes in a direct session for session management purposes. The TimeToReachQueue field 110 indicates the maximum time in milliseconds within which a user message has to reach the destination queue.

In the body portion 104 of the Establish_Connection packet, the ClientID field 112 contains the identification (ID) of the computer which initiates the session. The ServerID field 114 contains the ID of the receiver computer. In a preferred embodiment of the message queuing system, a distributed database is used to provide the message queue directory service. Due to the delay involved in data replication across the distributed database, the local directory server for the sender may not have been informed of all the changes in the network topology. As a result, the sender may try to establish a session with a wrong machine. The ServerID field is provided to allow verification that the receiver is indeed the one with which the sender attempts to form a message transfer session. The TimeStamp field 116 contains the time when the packet is sent out by the sender. This field is used for measuring the amount of some elapsed between the sending and receiving of the message. The Flags field 118 contains flags which include a flag for indicating the type of operating system used and a Refuse bit. The refuse bit is used by a node to inform the other node that it refuses to establish a session. The reasons for the refusal include, for example, that the ServerID is wrong, the packet version is not supported by the node, or the other node has reached its license limitation. The Data field 120 contains data of a pre-selected length, such as 512 bytes. The Data field is used to measure the time it takes to pass the given length of data in a round trip from the sender to the receiver and back.

After receiving the Establish_Connection packet 100 from the sender 82, the receiver 84 checks whether the ServerID is correct, the packet version is supported, and there is a license to create a new session. If the answers to these questions are true, the node 84 clears the refuse bit in the packet, sets its operating system type, and returns the modified packet immediately to the sender node 82 as a response packet 101 (FIG. 3).

Referring now to FIG. 5, After receiving the response packet, the sender 82 sends to the receiver 84 a Connection_Parameter packet 128 which contains session management parameters set by the sender 82. This provides information to the receiver indicating parameters required when the receiver sends its message packets to the sender, such as acknowledgment messages or original messages.

In the illustrated embodiment, the parameters include an acknowledgment timeout period 132, a persistence acknowledgment timeout period 134, and a transmission window size 136. The acknowledgment timeout period is the maximum amount of time that may pass between two consecutive session acknowledgments. If the sender does not receive a session acknowledgment for transmitted packets during this timeout period, it assumes that the session is no longer valid. As a result, it terminates the session, and tries later to retransmit all the packets the receipt of which has not been acknowledged. The persistence acknowledgment timeout period is the maximum time that may pass between completing the storage of a persistence packet and the sending of a storage acknowledgment. As described above, when the sender gets the storage acknowledgment, it stops the time consuming operation of storing of the packet on its disk. The use of the persistence acknowledgment timeout period allows storage acknowledgments to be returned quickly without adding too much traffic to the network. These two timeout periods are calculated based on the time in the TimeStamp field of the acknowledgment packet.

The window size 136 is the number of message packets the receiver 84 can transmit to the sender 82 before stopping to wait for an acknowledgment from the sender. This window size is set by the receiver according to its available resources so that it will not receive more message packets than it can properly handle. The message transfer session is established when the sender 82 receives a Connection_Parameter packet from the receiver 84 that contains the session parameters for message packet transmission from the sender to the receiver.

During the message transfer session, the sender 82 is allowed to transmit to the receiver 84 multiple message packets up to the number of packets specified by the window size set by the receiver. When the transmitted data reach the window size, the sender 82 stops sending and waits for the receiver 84 to return a session acknowledgment indicating the number of packets successfully received by the receiver 84. The receiver can also use this opportunity to send its own message packets to the sender. In this way, the message transfer operations in both directions are coordinated to avoid transmission collisions. The receiver 84 also sends a session acknowledgment when the acknowledgment timeout period set by the sender 82 has expired without receiving further packets from the sender. On the other hand, when a node is busy sending or receiving a message, an acknowledgment is not expected from it. The session acknowledgment protocol assumes that the session is active, and that the lack of a session acknowledgment is caused by a large message in transit which prevents the receiving node from sending its acknowledgment.

Turning now to FIG. 6, the session acknowledgment may be in the form of an internal packet 140. In the body 142 of the acknowledgment, an Acknowledgment Sequence Number field 144 contains the sequence number of the last successfully received persistent packet from the sender. The Persistent Message Storage Number field 146 and the Storage Flags field 148 together indicate the storage status of the persistent message packages transmitted to the receiving node 84. The Persistent Packet Storage Number field 146 contains the sequence number of a persistent packet that has been stored in the persistent queue 86 of the receiver 84 or forwarded to the next node 88 in the route. This number is used as a base number for the Storage Flag field 148. By setting the nth bit in the Storage Flags field 148, the receiver acknowledges that the nth persistent packet after the packet indicated in the Persistent Package Storage Number field 146 has been stored or forwarded to the next node 88. The Sync Session Acknowledgment field 150 contains the number of packets received, and the Sync Persistence Acknowledgment field 152 contains the number of persistent packets received. These two fields are used to check the synchronization between the sender and the receiver of the transmitted packets. When the sender node 82 receives the acknowledgment packet, it checks that the numbers in these two fields are the same as its own numbers. In case of inconsistency, the sender closes the session.

In accordance with an aspect of a preferred embodiment, the session acknowledgment packet 140 contains a Window Size field 154 which allows the node 84 sending the session acknowledgment 140 to set a new window size for message transmission thereto. By setting this field, a node dynamically adjusts the amount of packets the other node is allowed to send to it each time according to its available resources. If the node is low in resources, it reduces the message transfer window size to ensure that the message arrival rate does not exceed its capability to handle the message packets.

In accordance with another aspect of a preferred embodiment, the session acknowledgment may piggyback on a user message packet. Referring to FIG. 7, to accommodate the session acknowledgment, the format of a user message packet 160 includes an optional Session Acknowledgment section 162. This section 162 has the same format of the body of the session acknowledgment packet 140 shown in FIG. 6. When a Session Acknowledgment section 162 is included in a user message packet, a flag bit in the Flags field of the message header 168 is set to indicate its existence. The inclusion of a session acknowledgment section 162 in a user packet 160 avoids the need to send a separate internal packet, thereby reducing the data traffic on the session connection.

Referring back to FIG. 2, the proper routing of a message across a network 72 to its destination requires the knowledge of which nodes may be available as intermediate nodes in the message route for forwarding the messages using the session acknowledgment protocol described above. To this end, a mechanism is needed for checking the operating state of the various nodes (e.g., the nodes 82, 84, 88) in the network 72 or at least the target computer for the next message hop.

Figure 8:
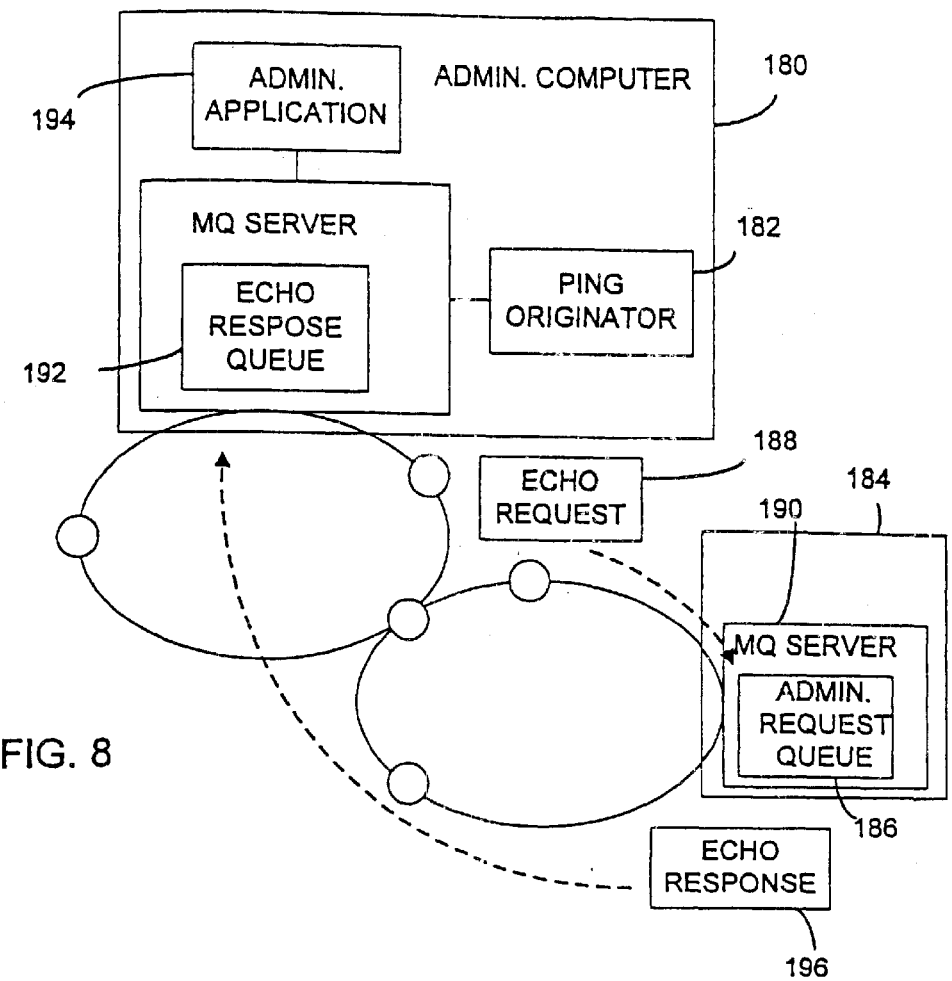
FIG. 8 is a schematic diagram showing a system for implementing a multi-ping mechanism based on asynchronous message delivery.

In accordance with another aspect of the invention, the message queuing system is used to implement an asynchronous "multi-ping" mechanism for generating a report of the operating state of remote computers. Referring to FIG. 8, an administrator using an administration computer 180 may want to know which computers in the message queuing network are in proper operation. To detect the operating states of selected computers, the administrator runs a Ping Originator program 182 to send a request message to each of the selected computers 184. Due to the asynchronous nature of message delivery, the Ping_Originator program can send many request messages at one time without having to wait for any response to the request messages. Each of the target computers 184 has an Administration Requests queue 186 for storing request messages from the administration computer.

When a target computer 184 receives the echo request message 188, it places the message in the Administration Request queue 186. The queue server 190 of the target computer reads the echo request message in the queue 186 and sends an echo response message 196 to an Echo Response queue 192 as specified in the echo request message. An administration application 194 reads the echo message from the Echo Response queue 192 and indicates on a video display which remote computers have responded to the echo request messages.

Because of the asynchronous message delivery and the message routing capability provided by the message queuing system, the Ping Originator application 182 and the administration application 194 do not have to be the same program and do not even have to be on the same computer. The administration application 194 can process the received echo messages at its own rate and update the status of a remote computer upon reading the echo message therefrom.

As another advantage of the multi-ping mechanism based on asynchronous message delivery, the remote computers 184 do not have to be on the same network or use the same connection protocol with the administration computer. They only have to be accessible through the underlying message queuing system.

Figure 9:
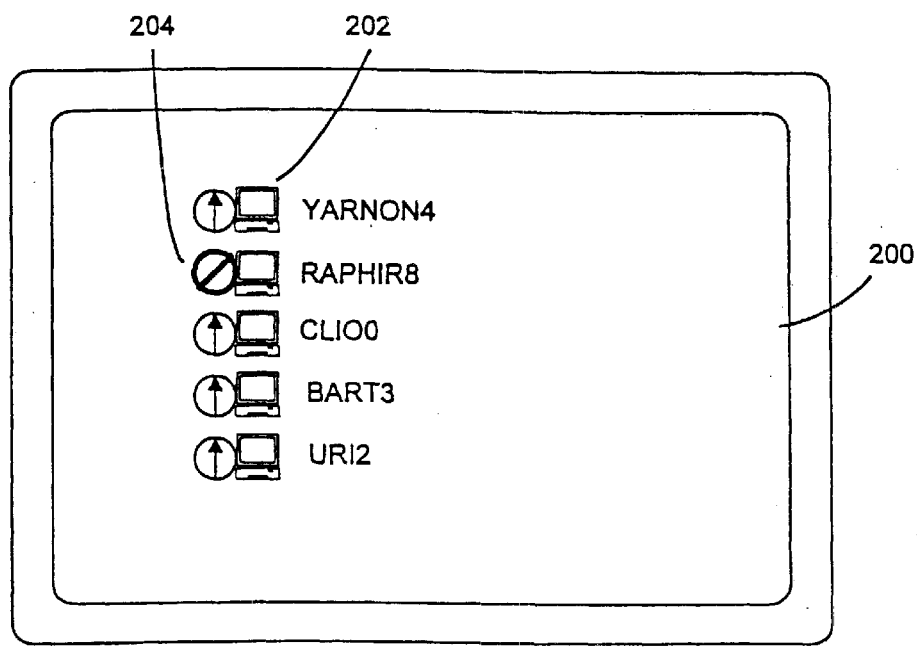
FIG. 9 is a schematic diagram showing a graphic display of the operating states of computers in a message queuing system according to the results of a multi-ping operation.

FIG. 9 shows as an example a Graphic User Interface (GUI) screen 200 used for the multi-ping operation. The remote computers are represented as icons on the interface screen 200. The administrator can include multiple remote computers in the asynchronous ping operation by selecting their corresponding icons and sending request messages to all of them at once. When an echo response is received from a remote computer within a pre-selected timeout period, the icon representing the remote computer is. changed to indicate that it is "alive." After the expiration of the timeout period, the icons representing those remote computers from which no echo response has been received are changed to indicate that they are "dead." For example, in the illustration of FIG. 9, the icon 202 indicates that the remote computer "yarnon4" is alive, and the icon 204 indicates that the remote computer "raphir8" is dead.

In view of the forgoing detailed description, it can be appreciated that the invention provides a session acknowledgment protocol on the message queue server level for managing the transfer of message packets in a session between two nodes. The session management parameters, which includes acknowledgment timeout periods and data transfer window sizes are established at the beginning of the session. By using window sizes chosen by the nodes, message transmissions in both directions are coordinated to avoid transmission collisions. The window size for a receiving node can be dynamically adjusted to match the available resources of the receiving node. In accordance with another aspect of the invention, a multi-ping mechanism based on the asynchronous message delivery of the message queuing system provides an efficient and flexible way for an administrator to monitor the operating states of multiple computers in the message queuing system.

What is claimed is:

1. A computer-readable medium having stored thereon a data structure comprising:
   a first data field containing data representing an acknowledgment sequence number identifying a last successfully received persistent packet by a receiving node from a sending node;
   a second data field containing data presenting a storage state of persistent packets received by the receiving node;
   a third data field containing data representing a number of packets received by the receiving node in the packet transmission;
   a fourth data field containing data representing a number of persistent packets received by the receiving node in the packet transmission;
   a fifth data field containing data representing a new window size for transmission of message packets to the receiving node.

2. A computer-readable medium as in claim 1, wherein the data in the second data field includes a base sequence number corresponding to a persistent packet stored by the receiving node and a plurality of persisted status flags for corresponding persistent packets having sequence numbers greater than the base sequence number, each persisted status flag indicating whether the corresponding persistent packet has been stored or forwarded by the receiving node to a third node.

3. A computer-readable medium as in claim 2, wherein the persisted status flags are in a form of bits each corresponding to a persistent packet having a sequence number greater than the base sequence number.

4. A computer-readable medium as in claim 2, wherein the data structure further includes a header field containing data representing a message header.

5. A computer-readable medium as in claim 4, wherein the data structure further includes a message data field containing message data of a message transmitted from the receiver node to the sending node.

6. A computer-readable medium having stored thereon a data structure comprising:

a first data field containing data representing an acknowledgment timeout period for a receiving node to send an acknowledgment of receipt of message packets transmitted thereto from a sending node during a message transfer session between the sending and receiving nodes;

a second data field containing data representing a persistent storage acknowledgment timeout period for the receiving node to send an acknowledgment of storage of persistent messages received by the receiving node from the sending node;

a third data field containing data representing a window size field for specifying a maximum number of message packets the receiving node is allowed to transmit to the sending node at one time.

7. A computer-readable medium as in claim 6, wherein the data structure further includes a header field containing data representing a message header.

8. A computer-readable medium having stored thereon computer-executable instructions for a sending node and a receiving node in a message queuing system to perform steps to manage a message transfer session between the sending and receiving nodes, the steps comprising:

sending, by the sending node, a session management packet to the receiving node, the session management packet having a data structure including a first data field containing data representing an acknowledgment timeout period for the receiving node to send an acknowledgment of receipt of message packets from the sending node during the message transfer session, a second data field containing data representing a persistent storage acknowledgment timeout period for the receiving node to send an acknowledgment of storage of persistent messages received from the sending node, and a third data field containing data representing a window size field for specifying a maximum number of message packets the receiving node is allowed to transmit to the sending node at one time;

transmitting, by the sending node, message packets to the receiving nodes, the message packets including persistent message packets; and sending, by the receiving node, a session acknowledgment packet to the sending node, the session acknowledgment packet having a data structure including a first data field containing data representing an acknowledgment sequence number identifying a last successfully received persistent packet by the receiving node from the sending node, a second data field containing data presenting a storage state of persistent packets received from the sending node, a third data field containing data representing a number of packets received by the receiving node in the packet transmission, a fourth data field containing data representing a number of persistent packets received by the receiving node in the packet transmission, and a fifth data field containing data representing a new window size for transmission of message packets to the receiving node.

9. A computer-readable medium as in claim 8, where the step of transmitting includes transmitting message packets up to a sending window size specified by the receiving node and waiting for the session acknowledgment message from the receiving node for the message packets transmitted.

10. A computer-readable medium as in claim 9, having further computer-executable instructions for the sending node to perform the step of closing the message transfer session when the number of packets and the number of persistent packets received by the receiving node as indicated in the session acknowledgment packet are inconsistent with a number of packets and a number of persistent packets sent by the sending node to the receiving node in the transmitting step.

11. A computer-readable medium as in claim 8, wherein the second data field of the session acknowledgment packet includes a base sequence number corresponding to a persistent packet stored by the receiving node and a plurality of persisted status flags for corresponding persistent packets having sequence numbers greater than the base sequence number, each persisted status flag indicating whether the corresponding persistent packet has been stored or forwarded by the receiving node to a next node of the message queuing system.

12. A computer-readable medium as in claim 11, wherein the persisted status flags are in a form of bits each corresponding to a persistent packet having a sequence number greater than the base sequence number.

13. A computer-readable medium as in claim 8, wherein the session acknowledgment packet further includes a message data field containing message data of a message transmitted by the receiving node to the sending node.

* * * * *

UNITED STATES PATENT AND TRADEMARK OFFICE
CERTIFICATE OF CORRECTION

PATENT NO.    : 6,477,590 B1
DATED         : November 5, 2002
INVENTOR(S)   : Habusha et al.

It is certified that error appears in the above-identified patent and that said Letters Patent is hereby corrected as shown below:

Column 5,
Line 1, "modules-depicted" should read -- modules depicted --.

Column 9,
Line 10, "message packets" should read -- message_packets --.

Column 10,
Line 13, "is. changed" should read -- is changed --.

Signed and Sealed this

Second Day of March, 2004

JON W. DUDAS
*Acting Director of the United States Patent and Trademark Office*